United States Patent [19]

Weber et al.

[11] Patent Number: 4,727,964

[45] Date of Patent: Mar. 1, 1988

[54] AIR DISC BRAKE ASSEMBLY WITH SHORTENED END CAP AND INTEGRAL CAST AIR CHAMBER BRACKET

[75] Inventors: James L. Weber, W. Bloomfield; Donald J. Davidson, Troy, both of Mich.

[73] Assignee: Rockwell International Corporation, Pittsburgh, Pa.

[21] Appl. No.: 916,928

[22] Filed: Oct. 8, 1986

[51] Int. Cl.[4] .............................................. F16D 65/32
[52] U.S. Cl. ................................................... 188/72.8
[58] Field of Search ..................... 188/72.4, 72.6, 72.7, 188/72.8, 72.9, 106 P

[56] References Cited

U.S. PATENT DOCUMENTS 4,022,300  5/1977  Afanador et al. ............. 188/72.8 X
4,036,330  7/1977  Henning et al. .................... 188/72.8
4,503,947  3/1985  Heidemann et al. ............... 188/72.8
4,529,067  7/1985  Scott ............................... 188/72.8 X
4,553,643  11/1985  Wilcox ............................ 188/72.8 X Primary Examiner—Duane A. Reger

[57] ABSTRACT

An air disc brake assembly having a shortened end cap and an integral air chamber bracket is provided. The shortened end cap is bolted to an end of the air cylinder which is opposite the end from which the piston extends. An air cylinder support portion is integral with the end cap and extends from the outer surface. This support portion has a plate with a recessed central portion and two end lobes for receiving air cylinder mounting bolts. A supporting web extends between the angular flange and the outer wall of the end cap to support the air cylinder. The end cap has stepped cylindrical surfaces to receive bearings and a fluted plan form.

4 Claims, 3 Drawing Figures

AIR DISC BRAKE ASSEMBLY WITH SHORTENED END CAP AND INTEGRAL CAST AIR CHAMBER BRACKET

BACKGROUND OF THE INVENTION

In disc brake systems, the search continues for better brakes having more compact, lighter and stronger structure which is easy to assemble and easy to repair. The present invention is a forward step in the solution of those problems.

SUMMARY OF THE INVENTION

A brake support for mounting on a spider extends around opposite sides of a disc. The fixed support has a slide for receiving a sliding brake shoe carrier adjacent a piston. The support also has spaced parallel trunnions for supporting a caliper assembly which extends over the rotor disc which is attached to a wheel assembly. The caliper assembly has a mounting means for mounting a brake shoe. The brake shoes are attached to the caliper mounting means and to the sliding mounting means by bolts which extend through the mounting means and through the brake shoes and which are attached to threaded members which extend through the brake shoes. The threaded members are permanently connected to central portions of flat leaf springs which extend outward over faces of the brake shoe. Brake pads extend outward from the brake shoes towards the rotor disc.

The caliper assembly has an integrally formed cylinder which receives the brake applying piston. A shortened end cap is bolted to an end of the cylinder opposite the end thereof from which the piston extends. The shortened end cap is cast integrally with an air cylinder support which extends outward from an outer surface of the end cap. The support has a plate with a recessed central portion and two end lobes for receiving air cylinder mounting bolts. The plate is part of an angular flange which extends outward from the sidewall of the shortened end cap. A supporting web extends between the angular flange and the outer wall of the end cap to support the torque loadings of the air cylinder. A brake applying lever is bent inward over the shortened end cap so that its first end is aligned beneath the central recess in the air cylinder supporting plate. The second large end of the brake applying lever is clamped to a shaft which extends into the end cap and cylinder and which is supported on a bearing on an inner cylindrical surface of the cast end cap. The end cap has stepped cylindrical surfaces which receive bearings and cam surfaces radially arranged to convert shaft torque to axial force upon the piston. A large radially extending surface between the innermost stepped surface and the inner bearing surface of the cast end cap supports axial thrust on the end cap. The end cap has a fluted plan form. Enlarged areas receive bolts which connect the end cap to the cylinder.

A preferred end cap for a disc brake caliper cylinder comprises a cast housing having an inner cylindrical surface for receiving a bearing and a generally flat end face at one axial end of the cap. A second end face abuts a cylinder in which a brake applying piston slides. The first end face has plural peripheral areas depressed for receiving bolt heads of bolts which extend through the cap and into the cylinder for bolting the cap to the cylinder. The cap has an outer surface between the first and second end faces. An integrally formed air chamber mounting bracket extends outward from the outer surface of the cap. The bracket has an integrally formed flange with mounting holes for receiving mounting bolts connected to an air chamber to be mountd on the flange of the bracket.

The bracket has an integrally formed web extending between the flange and an outer surface of the cap for supporting the flange outwardly spaced from the cap in a predetermined position. An air chamber drives linkage connected between an air chamber piston and a lever connected at one end of a shaft extending through the inner cylindrical surface of the cap. The integrally cast flange, web, cap and bolts extending through the cap into the cylinder support torque reactions of the air cylinder, shaft and linkage.

The preferred end cap apparatus has plural radially stepped, generally cylindrical surfaces extending inward from the second end face to the inner cylindrical surface for receiving roller bearings oriented on radial axes and cammed thrust members. The cap has an inner radially extending face between the cylindrical inner surface and the innermost of the plural stepped cylindrical surfaces for supporting axial reaction thrust of brake applying members within the cylinder and cap.

Preferably, the end cap apparatus has a generally fluted planform as viewed from the first end. Radially extended portions receive bolts connecting the cap to the cylinder. Radially inward portions are positioned between the bolt receiving portions.

In the preferred end cap apparatus the flange member comprises a generally angular flange having a support portion extending generally radially from the outer surface of the cap. The flange has a support portion extending from an outward terminus of the radially extending portion in a direction generally parallel to a tangent of the outer surface of the cap. The support portion has spaced holes for receiving bolts to mount an air cylinder.

The web extends between a portion of the outer surface of the cap, the radially extending portion of the flange and the support portion of the flange. The web is generally triangular in planform.

In a preferred embodiment, the support portion of the flange has two end lobes in which the holes for mounting the bolts for attachment to an air cylinder are located. A central recess in the support portion spacedly receives a piston rod and connecting links connecting an air cylinder to an actuating lever.

Preferably, an axial portion of the end cap body is radially extended in an area of attachment of the web.

In preferred embodiments the web extends generally radially from the outer surface of the end cap and is generally parallel to end faces of the end cap.

The preferred end cap apparatus has the web extending outward from a medial portion of an outer surface of the end cap. The flange extends from the web and is generally perpendicular to the web in a sense of direction toward the second end of the cap and away from the first end of the cap. An air cylinder is supported on the flange axially aligned with and radially outwardly spaced from the end cap and cylinder.

In a preferred embodiment, the present invention provides braking apparatus for a disc brake. A spider connects the brake to an axle housing. A brake support is connected to the spider. First and second opposed brake shoe carrying means are connected to the brake support. The first carrying means is a sliding means mounted on the support for supporting a brake shoe means in sliding relationship to the support. The second means comprises a caliper means extendinng over the support and over the sliding means for supporting a second brake shoe means on a second side of a disc opposed to the first brake shoe means. The caliper further comprises, on a side thereof adjacent the sliding means, a cylinder for housing a brake applying piston opposite the sliding means. The piston may be urged from the cylinder against the sliding means, urging the sliding means and brake pads supported thereon into contact with a disc, and reactively urging the cylinder and the caliper connected thereto and the second brake pads connected thereto to move oppositely to the piston and toward the disc interposed between the opposing brake pads, thereby applying the brakes. The cylinder is mounted within the caliper housing. A cast end cap is mounted on an end of the cylinder and extends outward from the cylinder and from the caliper.

Preferably, the end cap apparatus further comprises an air cylinder support means integrally formed with the end cap and extending therefrom for supporting a brake actuating air cylinder spaced from the end cap.

In a preferred embodiment the cap further has plural radially stepped, generally cylindrical surfaces extending inward from the second end face to the inner cylindrical surface for receiving roller bearings oriented on radial axes and cammed thrust members. The cap further comprises an inner radially extending face between the cylindrical inner surface and the innermost of the plural stepped cylindrical surfaces for supporting, with the bolts which interconnect the cap and the cylinder, axial reaction thrust of brake applying members within the cylinder and cap.

The preferred end cap apparatus has a generally fluted plan form as viewed from the first end, with radially extended portions receiving bolts connecting the cap to the cylinder and radially inward portions between the bolt receiving portions.

Preferably, the flange member comprises a generally angular flange having a portion extending generally radially from the outer surface of the cap, and the flange having a support portion extending from an outward terminus of the radially extending portion in a direction generally parallel to a tangent of the outer surface of the cap, the support portion having spaced holes for receiving bolts to mount an air cylinder.

In a preferred form of the apparatus the web extends between a portion of the outer surface of the cap, the radially extending portion of the flange and the support portion of the flange, and is generally triangular.

The support portion of the flange has two end lobes in which the holes for mounting the bolts for attachment to an air cylinder are located and a central recessed portion for spacedly receiving a piston rod and connecting links connecting an air cylinder to an actuating lever.

Preferably, the end cap is radially extended in an area of attachment of the web.

The preferred end cap apparatus includes the web extending generally radially from the outer surface of the end cap and generally parallel to end faces of the end cap.

In a preferred embodiment of the end cap apparatus the web extends outward from a medial portion of an outer surface of the end cap and the flange extends from the web and generally perpendicular to the web in a sense of direction toward the second end of the caP and away from the first end of the cap whereby an air cylinder is supported on the flange outwardly spaced from the end cap and cylinder.

These and further and other objects and features of the invention are apparent in the disclosure which includes the above and ongoing specification with the claims and the drawings.

DETAILED DESCRIPTION OF THE DRAWINGS

Figure 1:
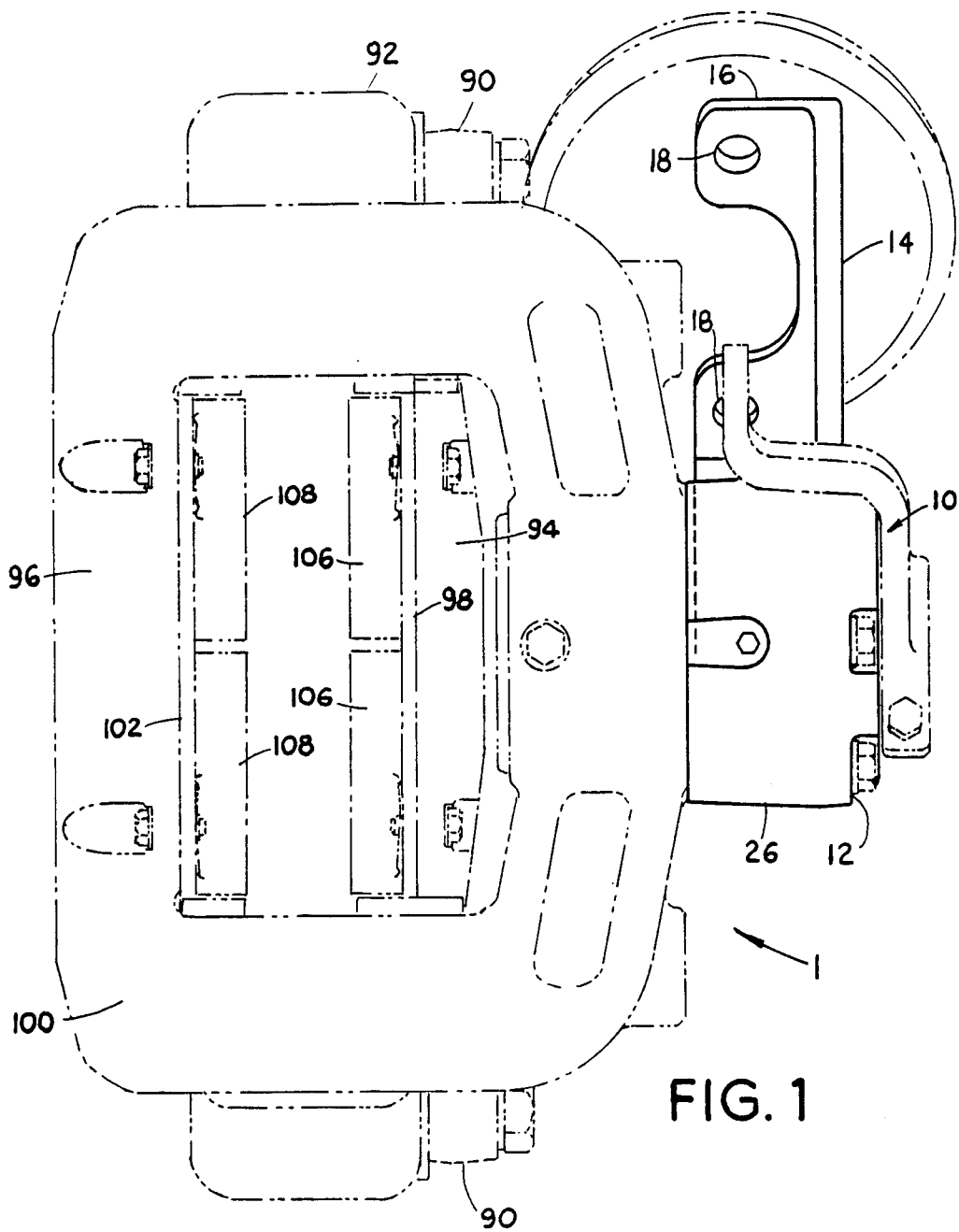
FIG. 1 is a plan view of a disc brake caliper assembly showing the shortened end cap and integral air cylinder mounting flange.
Figure 2:
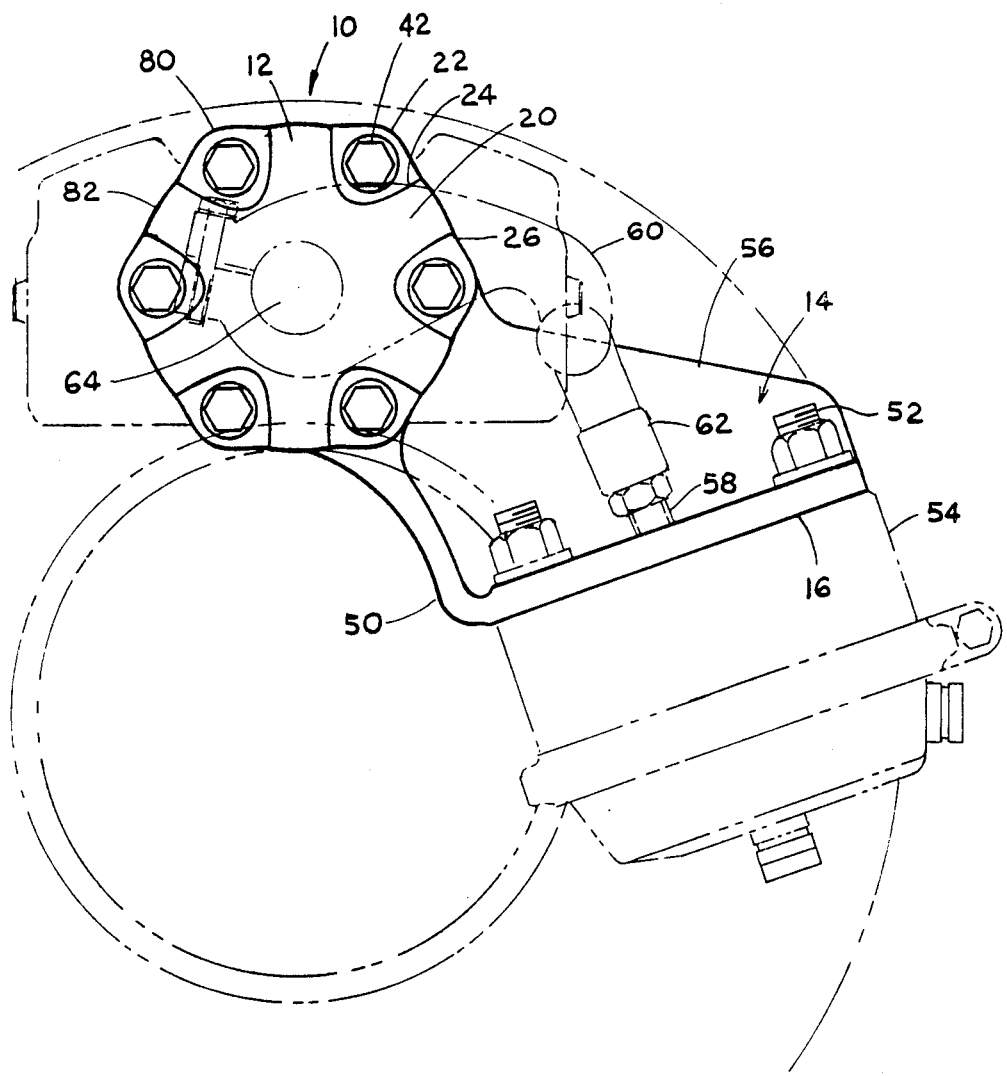
FIG. 2 is an elevational view of a disc and caliper assembly showing the end cap and integral air cylinder mounting flange and web.
Figure 3:
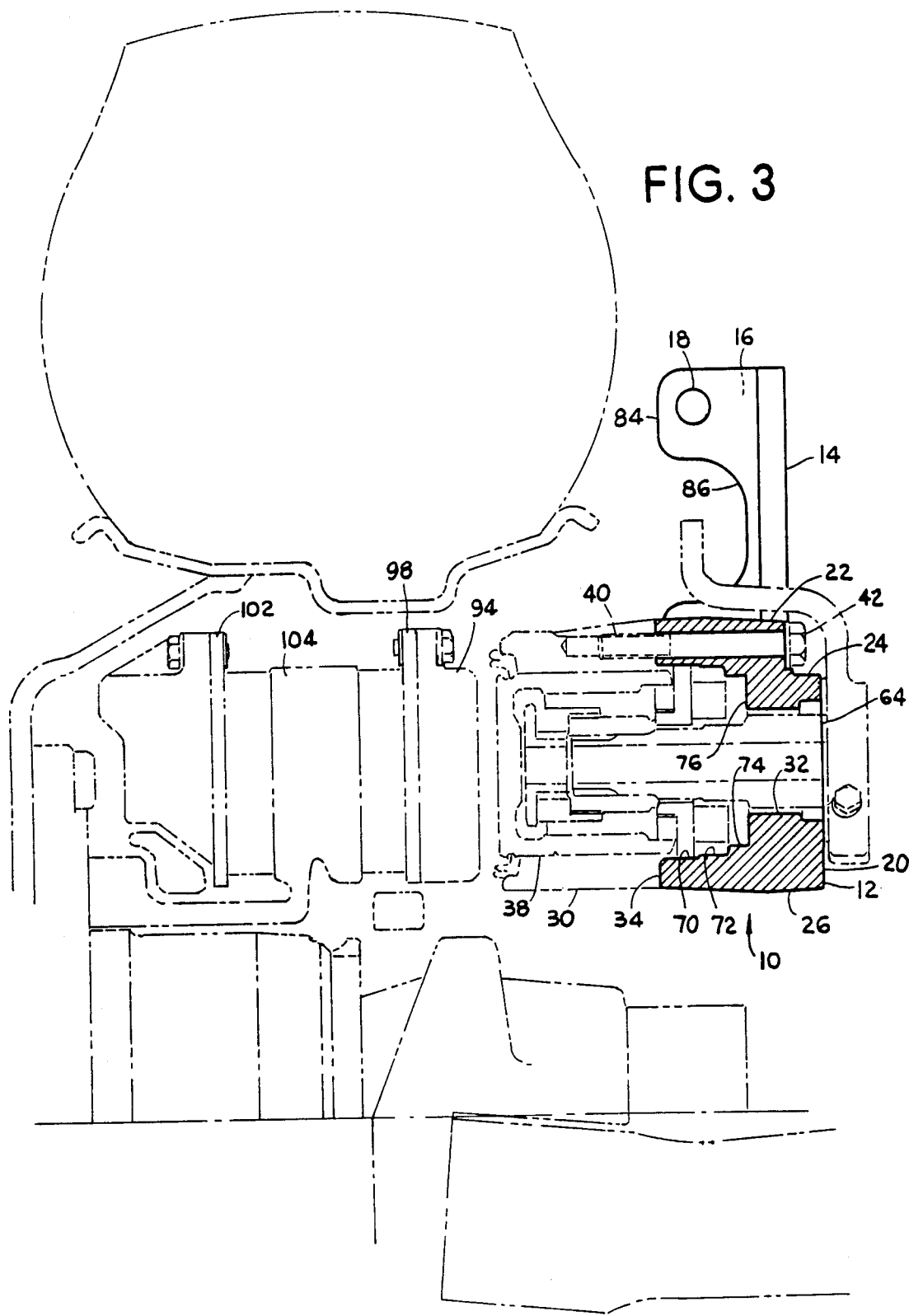
FIG. 3 is a sectional view showing the brake assembly and the shortened cast end cap with the integrally cast air cylinder support.

Referring to FIGS. 1-3, a brake assembly is generally indicated by the numeral 1. An end cap 10 has a cast body 12 and an integrally formed air chamber support 14. The air chamber support 14 has a mounting plate 16 with two lobes having holes 18 for receiving bolts which mount the air cylinder on plate 16. Plate 16 is formed as part of a flange which also includes a generally radially extending portion and angularly formed plate portion 16 which extends generally parallel to a tangent of the end cap body 12. A web 14 defines a portion 56 which has a generally triangular form, as shown in FIG. 2, adjoins a sidewall of end cap body 12 and the plate portion 16 and radial portion of the angular flange.

An end cap 10 for a disc brake caliper air cylinder 30 comprises a cast housing 12 having an inner cylindrical surface 32 for receiving a bearing. A generally flat end face 20 at one axial end of the cap is spaced opposite second end face 34 for abutting a cylinder 30 in which a brake applying piston 38 slides. The first end face 20 has plural radially extended peripheral areas 22 depressed 24 for receiving bolt heads 42 of bolts 40 which extend through the cap 10 and into the cylinder 30 for bolting the cap 10 to the cylinder 30. The cap 10 has an outer surface 26 between the first and second end faces 20 and 34. An integrally formed air chamber mounting bracket 14 extends outward from the outer surface 26 of the cap 10.

The bracket 14 has an integrally formed flange 50. Mounting holes 18 receive mounting studs 52 connected to an air chamber 54 to be mounted on the plate flange 16 of the bracket. The bracket 14 has an integrally formed web 56 extending between the flange 50 and an outer surface of the cap 10 for supporting the flange plate 16 outwardly spaced from the cap body 12 in a predetermined position. Air chamber 54 drives linkage 62 connected between an air chamber piston 58 and a lever 60 connected at one end of a shaft 64 extending through the inner cylindrical surface 32 of the cap 10. The integrally cast flange 50, web 56 and cap 10 and bolts 40 extending through the cap into the cylinder 30 support torque reactions of the air cylinder 54, shaft 64 and linkage 62.

The cap 10 further has plural radially stepped, generally cylindrical surfaces 70, 72, 74 extending inward from the second end face 34 toward the inner cylindrical surface 32 for receiving roller bearings oriented on radial axes and cammed thrust members. The cap 10 further comprises an inner radially extending face 76 between the cylindrical inner surface 32 and the innermost 74 of the plural stepped cylindrical surfaces for supporting axial reaction thrust of brake applying members within the cylinder 30 and cap 10.

The cap has a generally fluted planform as viewed from the first end 20 with radially extended portions 80 receiving bolts 40 connecting the cap to the cylinder and radially inward portions 82 between the bolt receiving portions 80.

The flange member 50 comprises a generally angular flange having a portion 51 extending generally radially from the outer surface 26 of the cap 10. The flange 50 has a support plate portion 16 extending from an outward terminus of the radially extending portion 51 in a direction generally parallel to a tangent of the outer surface 26 of the cap. The support plate portion 16 has the spaced holes 18 for receiving studs 52 to mount the air cylinder 54.

The web 56 extends between a portion of the outer surface 26 of the cap, the radially extending portion 51 of the flange 50 and the support portion 16 of the flange, whereby the web is generally triangular in planform.

The support plate portion 16 of the flange 50 has two end lobes 84 in which the holes 18 for mounting the studs 52 for attachment to an air cylinder 54 are located. A central recessed portion 86 for spacedly receiving a piston rod 58 and connecting links 62 connecting air cylinder 54 to actuating lever 60.

The web 56 extends generally radially from the outer surface 26 of the end cap and is generally parallel to end faces 20 and 34 of the end cap 10.

The web 56 extends outward from a medial portion of an outer surface 26 of the end cap 10 and the flange 50 extends from the web generally perpendicular to the web in a sense of direction toward the second end 34 of the cap and away from the first end 20 of the cap whereby an air cylinder 54 supported on the flange 16 is outwardly spaced from the end cap 10 and cylinder 30.

Braking apparatus 1 for a disc brake comprises a spider 90 for connecting the brake to an axle housing. A brake support 92 is connected to the spyder 90 and first and second opposed brake shoe carrying means 94 and 96 are connected to the brake support. The first carrying means 94 comprising sliding means 94 are mounted on the support for supporting a brake shoe 98 in sliding relationship to the support. The second means comprises a caliper 100 extending over the support 92 and over the sliding means 94 for supporting a second brake shoe 102 on a second side of a disc 104 opposed to the first brake shoe 98. The caliper further comprises on a side thereof adjacent the sliding means 94 a cylinder 30 for housing a brake applying piston 38 opposite the sliding means 94. The piston 38 may be urged from the cylinder 30 against the sliding means 94, urging the sliding means 94 and brake pads 106 supported thereon into contact with a disc 104 and reactively urging the cylinder 30 and the caliper 100 connected thereto and the second brake pads 108 connected thereto to move oppositely to the piston 38 and toward the disc 104 interposed between the opposing brake pads thereby applying the brake. The cylinder 30 is mounted within the caliper housing and cast end cap 10 is mounted on an end of the cylinder 30 and extends outward from the cylinder and from the caliper 100.

We claim:

1. An end cap for a disc brake air cylinder comprising a cast housing having an inner cylindrical surface for receiving a bearing, a first generally flat end face at one axial end of said cast housing and a second end face for abutting the air cylinder in which a brake applying piston slides at an end of said cylinder opposite the end from which the piston extends;

said first end face having plural peripheral depressed areas for receiving bolt heads of bolts which extend through said end cap and into said cylinder to bolt said end cap to said cylinder;

an outer surface of said end cap located between said first end face and said second end face from which an integrally formed mounting bracket extends and which bracket supports the air cylinder in which the brake applying piston slides;

an integrally formed mounting bracket extending outwardly from the outer surface of said end cap which is provided with an integrally formed flange having mounting holes to receive mounting bolts connecting said end cap to said air chamber at said flange;

said integrally formed flange of said mounting bracket having a web portion of generally triangular shape extending beyond the outer surface of said end cap for supporting a flange plate which is outwardly spaced from said end cap;

a flange plate to support said air chamber in a predetermined position to permit the piston to drive a lever linkage between said air cylinder and a means applied to the brake shoes;

plural radially stepped, generally cylindrical surfaces extending inwardly from said inner cylindrical surface of said end cap for receiving bearings which are located on the radial axis of said end cap;

and an inner radially extending face between said cylindrical inner surface and the innermost of said plural stepped surfaces to support bolts which interconnect said cap and said cylinder to withstand the thrust of said piston and lever linkage within the cylinder and end cap.

2. The apparatus as claimed in claim 1 wherein said end cap is provided with a generally fluted platform at said first end, and said platform is provided with radially extending portions adapted to receive bolts for connecting said first end of said cap to said cylinder and with inward portions between said radially extending bolt receiving portions.

3. The apparatus as claimed in claim 1 wherein said web portion extends radially from the outer surface of said cap with a support portion which extends in a direction generally parallel to a tangent of the outer surface of said cap, and said support portion having spaced holes for receiving bolts to mount to said air cylinder.

4. The apparatus as claimed in claim 3 wherein said support portion has two end lobes and said lobes have holes for mounting attachment to said air cylinder and wherein a central recessed portion is provided in said support portion for receiving a piston rod and connecting links for said piston.

* * * * *